(12) United States Patent
Han

(10) Patent No.: US 11,760,231 B2
(45) Date of Patent: Sep. 19, 2023

(54) DEVICE AND METHOD FOR DETECTING PASSENGER IN VEHICLE

(71) Applicants: Hyundai Motor Company, Seoul (KR); Kia Motors Corporation, Seoul (KR)

(72) Inventor: Seung Su Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 866 days.

(21) Appl. No.: 16/802,019

(22) Filed: Feb. 26, 2020

(65) Prior Publication Data

US 2021/0053466 A1 Feb. 25, 2021

(30) Foreign Application Priority Data

Aug. 19, 2019 (KR) .................. 10-2019-0101207

(51) Int. Cl.
*H04W 4/48* (2018.01)
*B60Q 9/00* (2006.01)
*B60N 2/02* (2006.01)
*B60Q 5/00* (2006.01)
*B60N 2/00* (2006.01)

(52) U.S. Cl.
CPC ........... *B60N 2/0276* (2013.01); *B60N 2/002* (2013.01); *B60N 2/0248* (2013.01); *B60Q 5/005* (2013.01); *B60Q 9/00* (2013.01); *H04W 4/48* (2018.02)

(58) Field of Classification Search
CPC .... B60N 2/002; B60N 2/0248; B60N 2/0276; B60Q 5/005; B60Q 9/00
See application file for complete search history.

(56) References Cited

U.S. PATENT DOCUMENTS

2018/0141490 A1* 5/2018 Sifuentes ............... B60W 40/08
2018/0272977 A1* 9/2018 Szawarski ......... B60R 21/01512

* cited by examiner

*Primary Examiner* — Charles J Han
(74) *Attorney, Agent, or Firm* — Fox Rothschild LLP

(57) ABSTRACT

A device and a method for detecting a passenger within a vehicle are provided. The device includes a sensor mounted inside the vehicle and a vehicle network connection device that receives a position and a backrest angle of each seat in the vehicle and transmits a control signal for adjusting the position and the backrest angle of each seat in the vehicle. A controller performs primary detection using the sensor in a precise detection mode determined based on the received position and backrest angle of each seat in the vehicle, and performs final detection using the sensor in a general detection mode while adjusting the position and backrest angle of each seat in the vehicle.

13 Claims, 7 Drawing Sheets

DEVICE AND METHOD FOR DETECTING PASSENGER IN VEHICLE

CROSS-REFERENCE TO RELATED APPLICATION

This application claims the benefit of priority to Korean Patent Application No. 10-2019-0101207, filed on Aug. 19, 2019, the entire contents of which are incorporated herein by reference.

TECHNICAL FIELD

The present disclosure relates to a technology for detecting a passenger in a vehicle with improved accuracy, and more particularly, to a technology that provides an alert in response to detecting a passenger remaining in a vehicle.

BACKGROUND

Sometimes a passenger in a traveling vehicle is a child, an infant, or elderly and when a vehicle is stopped along a road side for a longer period of time, sometimes the passenger remains in the vehicle while a driver or other vehicle passengers exit the vehicle. For example, a child sleeping in the vehicle may be left in the vehicle while a driver briefly exits the vehicle. In such a situation, a driver may close all windows of the vehicle for safety reasons and to prevent external dust from entering the vehicle while leaving the child alone in the vehicle, then may activate a child lock system to prevent a door from being opened inside the vehicle in case of a possible emergency (e.g., the child may wake up and open the door).

Additionally, the driver often times locks the door to prevent an intruder form opening the door. In this scenario, an interior temperature of the vehicle may increase due to solar heat. Especially in summer, the temperature increases rapidly within the vehicle, making breathing difficult, but the closed window prevents passage of outside air and may lead to further hazards for the child or other passenger within the vehicle.

When facing a hazard (e.g., choking accident), the child alone in the vehicle may attempt to pull a door lever to escape the vehicle. In addition, while oxygen in the vehicle is gradually reduced due to breathing in a closed space for a long period of time, a concentration of carbon dioxide emitted from the child during the breathing is gradually increased, and eventually the child may suffocate.

Furthermore, when an adult is left the vehicle while the engine remains on and an air conditioner or a heater is turned on, the interior of the vehicle may be filled with toxic gas, which is fatal to the child increasing the risk time frame. As a conventional technology for solving this, a technology for detecting a presence of a passenger in the vehicle has been developed by mounting a pressure sensor for each seat of the vehicle. However, such a technique is unable to identify whether it is the passenger or an object present in the vehicle thus decreasing overall accuracy of the detection.

The contents described in this section are intended to enhance the understanding of the background of the invention, and may include contents not previously known to those of ordinary skill in the art.

SUMMARY

The present disclosure provides a device and a method for detecting a passenger in a vehicle that may be a child or a pet left in the vehicle with improved accuracy by primarily detecting the passenger in a precise detection mode determined based on a position and a backrest angle of each seat in the vehicle and finally detecting the passenger in a general detection mode by adjusting the position and the backrest angle of each seat in the vehicle.

The technical problems to be solved by the present inventive concept are not limited to the aforementioned problems, and any other technical problems not mentioned herein will be clearly understood from the following description by those skilled in the art to which the present disclosure pertains. Further, it will be easily understood that the objects and advantages of the present disclosure may be realized by the means set forth in the claims and combinations thereof.

According to an aspect of the present disclosure, a device for detecting a passenger in a vehicle may include a sensor mounted inside the vehicle, a vehicle network connection device configured to receive a position and a backrest angle of each seat in the vehicle and transmit a control signal for adjusting the position and the backrest angle of each seat in the vehicle, and a controller configured to perform primary detection using the sensor in a precise detection mode determined based on the received position and backrest angle of each seat in the vehicle, and perform final detection using the sensor in a general detection mode while adjusting the position and backrest angle of each seat in the vehicle.

In an exemplary embodiment, the device may further include a storage configured to store a reference position and a reference backrest angle of each seat in the vehicle. In addition, the controller may be configured to perform the primary detection in the precise detection mode when even one of the seats in the vehicle does not satisfy the reference position and the reference backrest angle, adjust a position and a backrest angle of the seat that do not satisfy the reference position and reference backrest angle to the reference position and reference backrest angle when the passenger is detected, and perform the final detection in the general detection mode.

The controller may be configured to move the seat to the forefront and adjust the backrest angle to the reference backrest angle when the passenger is located on the seat that does not satisfy the reference position and the reference backrest angle, and move the seat to the forefront and adjust the backrest angle to a minimum backrest angle when the passenger is not located on the seat. The device may further include an alerting device configured to output an alert indicating that the passenger is located in the vehicle. The alerting device may be configured to output a visually alert through an emergency light of the vehicle, an audio alert through a horn of the vehicle, and transmit an alert message to a smartphone of a driver. The sensor may be mounted on an overhead console inside the vehicle.

According to another aspect of the present disclosure, a method for detecting a passenger in a vehicle may include receiving a position and a backrest angle of each seat in the vehicle, performing primary detection in a precise detection mode determined based on the received position and backrest angle of each seat in the vehicle, and performing final detection in a general detection mode while adjusting the position and backrest angle of each seat in the vehicle.

In an exemplary embodiment, the method may further include storing a reference position and a reference backrest angle of each seat in the vehicle. The performing of the primary detection may include performing the primary detection in the precise detection mode when even one of the seats in the vehicle does not satisfy the reference position and the reference backrest angle. Additionally, the performing of the final detection may include adjusting a position and a backrest angle of the seat that do not satisfy the reference position and reference backrest angle to the reference position and reference backrest angle when the passenger is detected as the primary detection result, and performing the final detection of the passenger in the vehicle in the general detection mode.

The adjusting of the position and the backrest angle of the seat may include moving the seat to the forefront and adjusting the backrest angle to the reference backrest angle when the passenger is located on the seat that does not satisfy the reference position and the reference backrest angle, and moving the seat to the forefront and adjusting the backrest angle to a minimum backrest angle when the passenger is not located on the seat that does not satisfy the reference position and the reference backrest angle. The method may further include alerting that the passenger is located in the vehicle by outputting a alerting visual alert through an emergency light of the vehicle, an audio using a horn of the vehicle, and transmitting an alert message to a smartphone of a driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
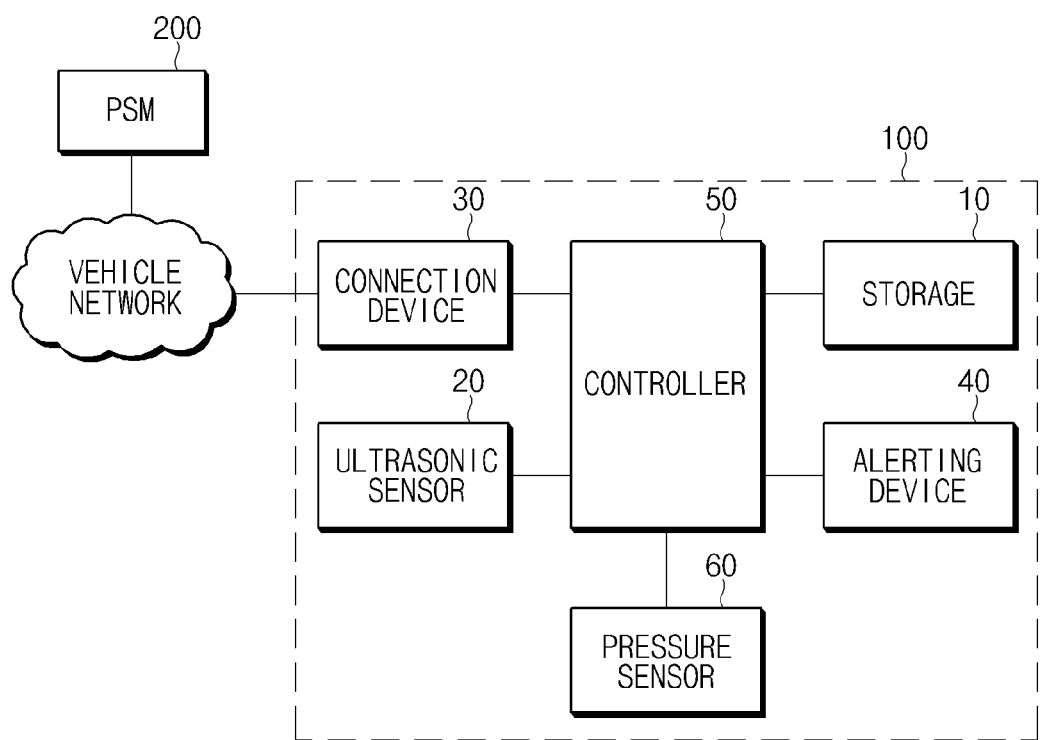
FIG. 1 is a block diagram of a device for detecting a passenger in a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of a device for detecting a passenger in a vehicle according to an exemplary embodiment of the present disclosure. As shown in FIG. 1, a device 100 for detecting a passenger in a vehicle according to an exemplary embodiment of the present disclosure may include storage 10, an ultrasonic sensor 20, a connection device 30, an alerting device 40, a controller 50, and a pressure sensor 60. The controller 50 (e.g., device controller) may be configured to operate the other components of the device 100. In this connection, the components may be implemented in combination with each other or some of the components may be omitted depending on a scheme for implementing the device 100 for detecting the passenger in the vehicle according to an exemplary embodiment of the present disclosure. In a description of the components, first, the storage 10 may be configured to store various logic, algorithms, and programs required to primarily detect the passenger in a precise detection mode determined based on a position and a backrest angle of each seat in the vehicle, and to finally detect the passenger in a general detection mode by adjusting the position and the backrest angle of each seat in the vehicle.

The storage 10 may be configured to store a reference position and a reference backrest angle of a first row seat of the vehicle, a reference position and a reference backrest angle of a second row seat, and a reference position and a reference back angle of a third row seat as conditions for determining a passenger in the vehicle detection mode (e.g., the precise detection mode and the general detection mode). In an exemplary embodiment of the present disclosure, a vehicle having the first row seat, the second row seat, and the third row seat is described as an example. However, the present disclosure may be applied to a vehicle having a fourth row seat and a fifth row seat, so that the present disclosure is not necessarily limited thereto.

The storage 10 may include at least one type of a storage medium of at least one type of memory such as a flash memory type, a hard disk type, a micro type, and a card type (for example, an SD card (Secure Digital Card) or an XD card (eXtream Digital Card)), and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

Figure 2:
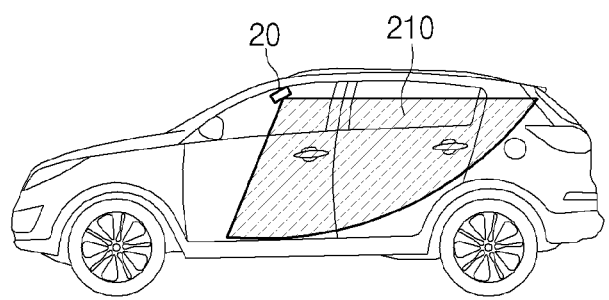
FIG. 2 is a view illustrating a mounting position in a vehicle of an ultrasonic sensor disposed in a device for detecting a passenger in the vehicle according to an exemplary embodiment of the present disclosure.

Further, the ultrasonic sensor 20 may be, for example, a single ultrasonic sensor that is mounted on an overhead console of the vehicle, which may be operated by the controller 50. Hereinafter, a mounting position and a detection region in the vehicle of the ultrasonic sensor 20 will be described in detail with reference to FIG. 2. FIG. 2 is a view illustrating a mounting position in a vehicle of an ultrasonic sensor disposed in a device for detecting a passenger in the vehicle according to an exemplary embodiment of the present disclosure.

As shown in FIG. 2, the ultrasonic sensor 20 disposed in the device 100 for detecting the passenger in the vehicle according to an exemplary embodiment of the present disclosure may be mounted on the overhead console inside the vehicle. The detection region of such ultrasonic sensor 20 is shown as to 210'. In this connection, the detection region 210 of the ultrasonic sensor 20 may include a region (shade region) that is difficult to detect based on the position and the backrest angle of the seat (including a headiest) in each row. The connection device 30 provides an interface with a vehicle network, which enables information transmission/reception with various systems (modules) mounted on the vehicle via the vehicle network.

In particular, the connection device 30 may be configured to receive the position and backrest angle of each seat in the vehicle from a power seat module (PSM) mounted on the vehicle via the vehicle network, and transmit a control signal for adjusting the position and backrest angle of each seat in the vehicle to the PSM. In this connection, the vehicle network may include a Controller Area Network (CAN), a Local Interconnect Network (LIN), a FlexRay, a Media Oriented Systems Transport (MOST), an Ethernet, and the like.

Figure 3:
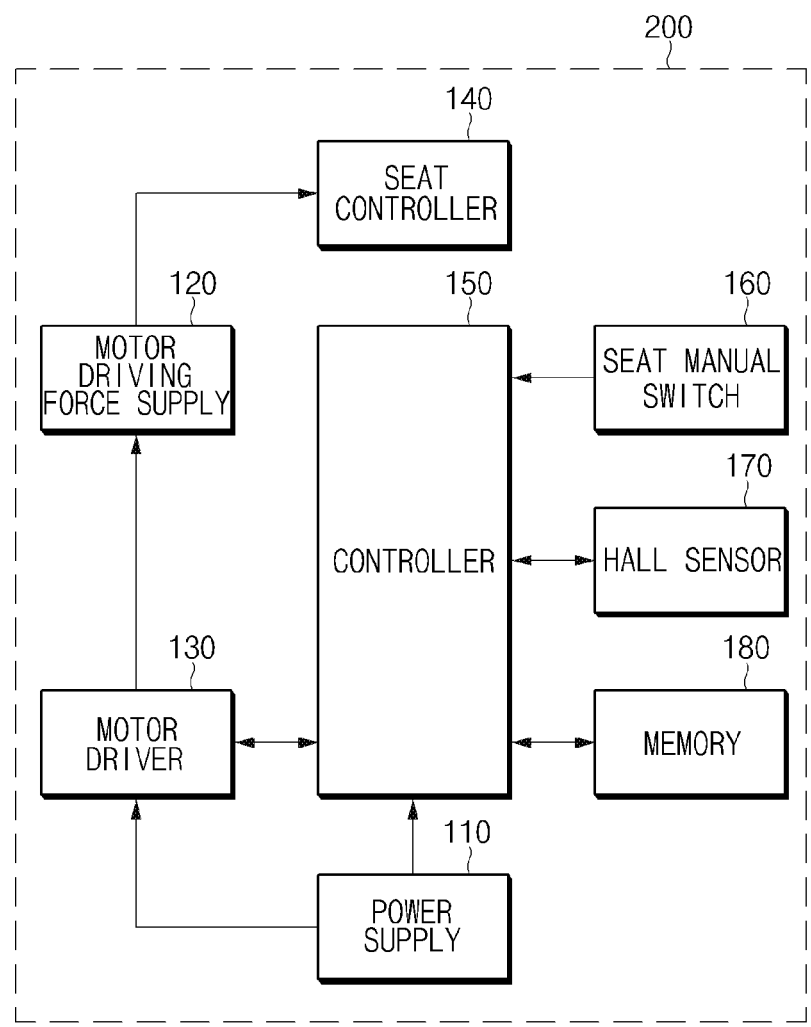
FIG. 3 is a block diagram of a PSM in associated with a device for detecting a passenger in a vehicle according to an exemplary embodiment of the present disclosure.

Hereinafter, a configuration of the PSM will be described with reference to FIG. 3. FIG. 3 is a block diagram of a PSM in associated with a device for detecting a passenger in a vehicle according to an exemplary embodiment of the present disclosure. As shown in FIG. 3, a PSM 200 associated with the device 100 for detecting the passenger in the vehicle according to the present disclosure may include a power supply 110, a motor driving force supply 120, a motor driver 130, a seat controller 140, a controller 150 (e.g., PSM controller), a seat manual switch 160, a hall sensor 170, and a memory 180. In a description of the components, first, the power supply 110 may be configured to supply power, which may include a battery mounted in the vehicle.

The motor driving force supply 120 may rotate four motors by the power supplied from the power supply 110 to output driving force. In the motor driver 130, three relays for driving the four motors may be connected to the four motors, and the motor driver 130 may be configured to drive the four motors through the three relays. In this connection, two of the four motors may use one output terminal together, to connect the four motors to the three relays. The seat controller 140 may be configured to adjust the seat in a front/rear direction or in a vertical direction, and the like based on the driving force output from the motor driving force supply 120. In other words, the seat controller 140 may be configured to adjust the slide, tilt, recline, height, and the like of the seat based on the driving force of the motor.

The PSM controller 150 may be configured to change the power supplied from the power supply 110 to a constant voltage and use the constant voltage as its own power, and receive a command signal from the seat manual switch 160 as a CAN signal to adjust a seat corresponding to the command signal. In particular, the PSM controller 150 may be configured to receive a control signal for adjusting the position and the backrest angle of each seat in the vehicle from the device controller 50 disposed in the device 100 for detecting the passenger in the vehicle via a CAN. In this connection, the controller 150 may be implemented in a form of an integrated circuit (IC) chip, such as a Main Control Unit (MCU), an Electronic Control Unit (ECU), and the like. The controller 150 may be configured to receive the command signal through two hard wires for each motor from the seat manual switch 160. In this connection, the command signal may be a signal associated with a slide, tilt, recline, and height adjustment of the seat. Further, the controller 150 may be configured to execute the tilt operation after a slide operation is completed, or execute the height operation after a recline operation is completed, without simultaneously operating the four motors during an operation control of the seat.

The seat manual switch 160 may be configured to selectively receive a command signal for adjusting the seat in the front and rear direction or in the vertical direction from the driver. The hall sensor 170 may be installed at a position that corresponds to the motor, and may be configured to detect a rotation position of the motor as a rotor of the motor rotates. The memory 180 may be configured to store the rotation position of the motor corresponding to the position of the seat.

Further, the alerting device 40 may be configured to output an alert, when a child or a pet is detected in the vehicle and the alert may include a visual alert, an audio alert, and the like. For example, when the child or the pet (or other type of passenger left in the vehicle) is detected in the vehicle, the alerting device 40 may be configured to output an alert indicating that the child or the pet is in the vehicle visually through a cluster, an audio video navigation (AVN)

system, or an emergency light mounted on the vehicle, or output an audio alert through a horn mounted on the vehicle, or may be configured to transmit an alert message to a smartphone of the driver via a telematics terminal mounted on the vehicle.

Moreover, the controller 50 may be configured to execute overall control such that each of the above components may perform a function thereof. The controller 50 may be implemented in a form of hardware, or in a form of software, and in one example, may also be implemented in a form of a combination of the hardware and the software. The controller 50 may be implemented as a microprocessor, but is not limited thereto. In one example, the controller 50 may be implemented as an integrated body unit (IBU). In particular, the controller 50 may be configured to perform various controls required to primarily detect the passenger in the precise detection mode determined based on the position and the backrest angle of each seat in the vehicle using the ultrasonic sensor 20, and to finally detect the passenger in the general detection mode by adjusting the position and the backrest angle of each seat in the vehicle using the ultrasonic sensor 20.

The controller 50 may be configured to determine the detection mode based on the position and the backrest angle of each seat in the vehicle received from the PSM 200 through the connection device 30. In this connection, the controller 50 may be configured to start a detection process when a detection function is activated (e.g., when a detection button is pressed or otherwise engaged) in a state in which all doors of the vehicle are locked.

Figure 4A:
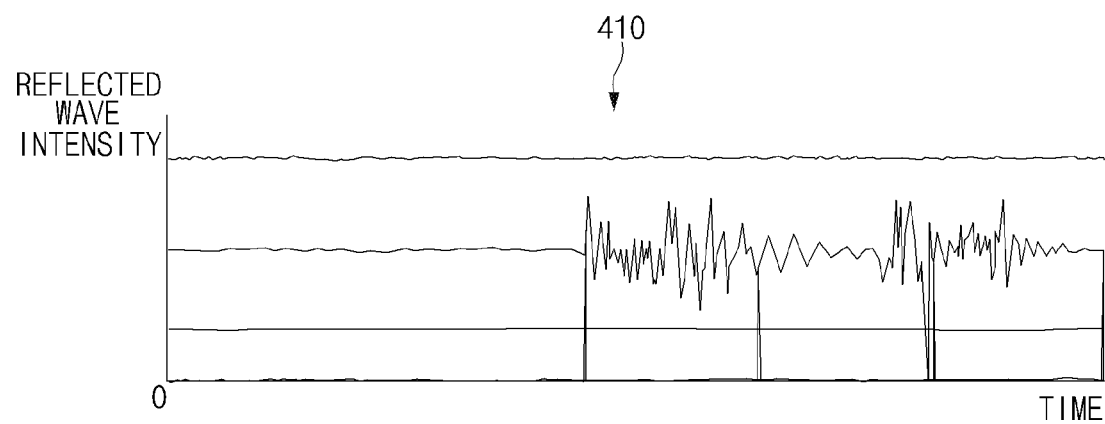
FIG. 4A is a diagram illustrating a general detection mode of a controller disposed in a device for detecting a passenger in a vehicle according to an exemplary embodiment of the present disclosure.

Hereinafter, the detection mode determined by the controller 50 will be described with reference to FIGS. 4A and 4B. FIG. 4A is a diagram illustrating a general detection mode of a controller disposed in a device for detecting a passenger in a vehicle according to an exemplary embodiment of the present disclosure.

As shown in FIG. 4A, a general detection mode 410 of the controller 50 disposed in the device for detecting the passenger in the vehicle according to an exemplary embodiment of the present disclosure is a mode in which the controller 50 is used to finally determine whether the passenger (e.g., the child, the pet, and the like) is in the vehicle. When a case in which an intensity of a reflected wave input to the ultrasonic sensor 20 exceeds a first threshold (e.g., about 100) for a first threshold period of time (e.g., about 500 ms) is referred to as "one time detection", it may be determined that the passenger is in the vehicle when there is "3 times consecutive detections".

For example, in the vehicle equipped with the seats of the first to third rows, such general detection mode may be applied when the position and the backrest angle of the first row seat are the reference position and the reference backrest angle, the position and backrest angle of the second row seat are the reference position and the reference backrest angle, and the position and the backrest angle of the third row seat are the reference position and the reference backrest angle. When the position and the backrest angle of each seat in the vehicle satisfy the reference position and the reference backrest angle, the controller 50 may be configured to detect the passenger in the vehicle in the general detection mode without additionally adjusting the position and the backrest angle of each seat in the vehicle, and may be configured to output an alert through the alerting device 40 in response to detecting the passenger.

Figure 4B:
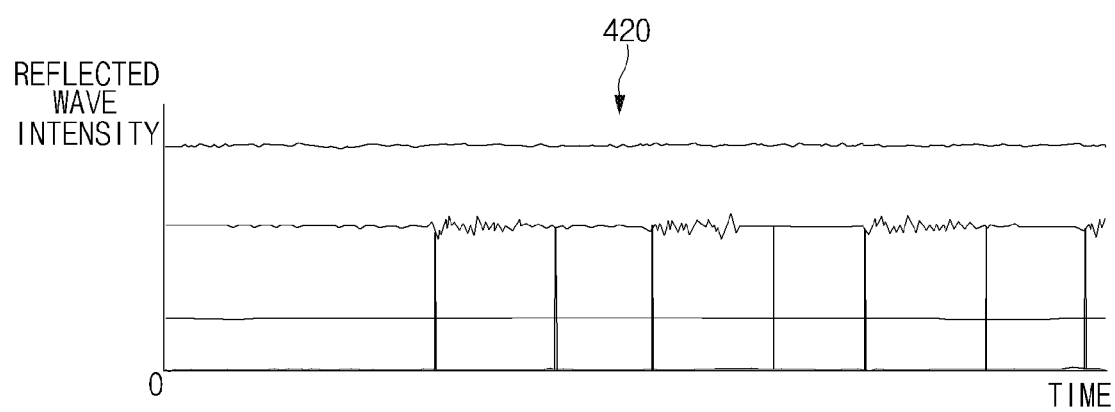
FIG. 4B is a view illustrating a precise detection mode of a controller disposed in a device for detecting a passenger in a vehicle according to an exemplary embodiment of the present disclosure.

FIG. 4B is a view illustrating a precise detection mode of a controller disposed in a device for detecting a passenger in a vehicle according to an exemplary embodiment of the present disclosure. As shown in FIG. 4B, a precise detection mode 420 of the controller 50 disposed in the device for detecting the passenger in the vehicle according to an exemplary embodiment of the present disclosure is a mode used to primarily detect whether the passenger (e.g., the child, the pet, and the like) is in the vehicle. Even when a case in which the intensity of the reflected wave input to the ultrasonic sensor 20 exceeds a second threshold (e.g., about 50) for a second threshold period of time (e.g., about 50 ms) occurs only one time, it may be primarily detected that the passenger is in the vehicle, immediately.

For example, in the vehicle equipped with the seats of the first to third rows, such precise detection mode may be applied when even one of the seats of the first to third rows is not in the reference position and the reference backrest angle. In other words, since the shade region occurs due to the seat which does not satisfy the reference position and the reference backrest angle, the controller 50 may be configured to primarily detect the passenger in the precise detection mode and finally detect the passenger in the general detection mode.

When even one of the seats in the vehicle does not satisfy the reference position and the reference backrest angle, the controller 50 may be configured to primarily detect whether there is the passenger (e.g., moving object) in the precise detection mode, adjust a position and a backrest angle of a corresponding seat (e.g., a seat that does not satisfy the reference position and the reference backrest angle) to the reference position and the reference backrest angle when the passenger is detected, then finally detect the passenger in the vehicle in the general detection mode.

In this connection, when adjusting the position and the backrest angle of the corresponding seat to the reference position and the reference backrest angle, the controller 50 may be configured to move the corresponding seat to the forefront and adjust the backrest angle of the corresponding seat to the reference backrest angle when the passenger detected through the ultrasonic sensor 20 is located on the corresponding seat, and move the corresponding seat to the forefront and adjust the backrest angle of the corresponding seat to a minimum backrest angle (e.g., an angle at which a backrest is maximally folded) when the passenger is not located on the corresponding seat. In particular, the controller 50 may be configured to determine whether the passenger is located on the corresponding seat using the pressure sensor 60 when adjusting the position and the backrest angle of the corresponding seat to the reference position and the reference backrest angle. When both the seat of the first row and the seat of the second row do not satisfy the reference positions and reference backrest angles thereof, respectively, the controller 50 may be configured to sequentially adjust the seats starting from the seat of the first row.

Figure 5:
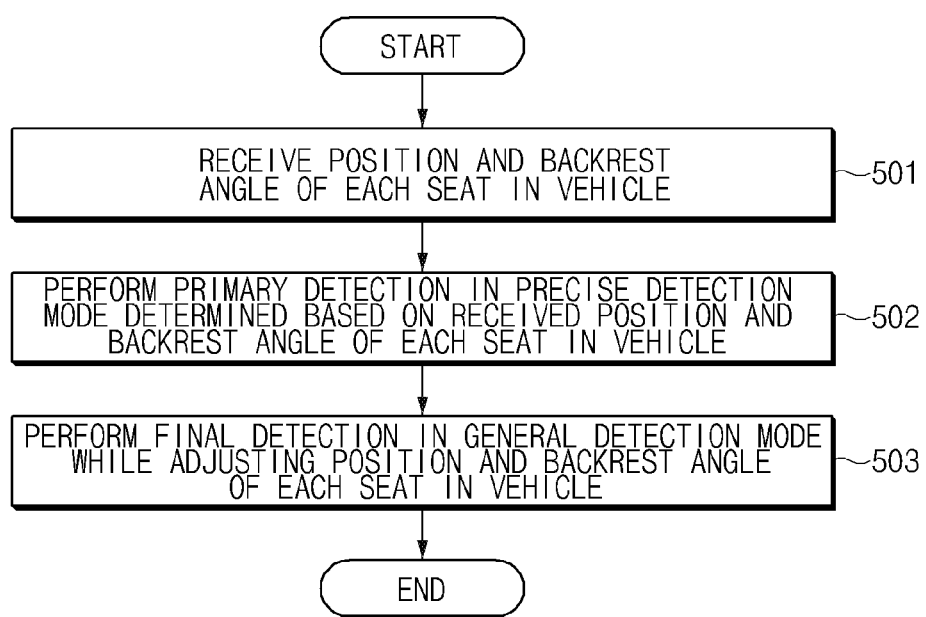
FIG. 5 is a flowchart for a method for detecting a passenger in a vehicle according to an exemplary embodiment.

FIG. 5 is a flowchart for a method for detecting a passenger in a vehicle according to an exemplary embodiment. First, the controller 50 may be configured to receive the position and the backrest angle of each seat in the vehicle through the connection device 30 (501). Thereafter, the controller 50 may be configured to perform the primary detection in the precise detection mode determined based on the position and the backrest angle of each seat in the vehicle (502). In this connection, the controller 50 may be configured to perform the detection in the precise detection mode when even one of the seats in the vehicle does not satisfy the reference position and the reference backrest angle. In addition, the ultrasonic sensor 20 may be mounted on the overhead console in the vehicle.

Thereafter, the controller 50 may be configured to perform the final detection in the general detection mode while adjusting the position and the backrest angle of each seat in the vehicle in association with the PSM 200 via the connection device 30 (503). In this connection, an accuracy of the general detection mode is higher than that of the precise detection mode in the detecting of the passenger in the vehicle.

Figure 6:
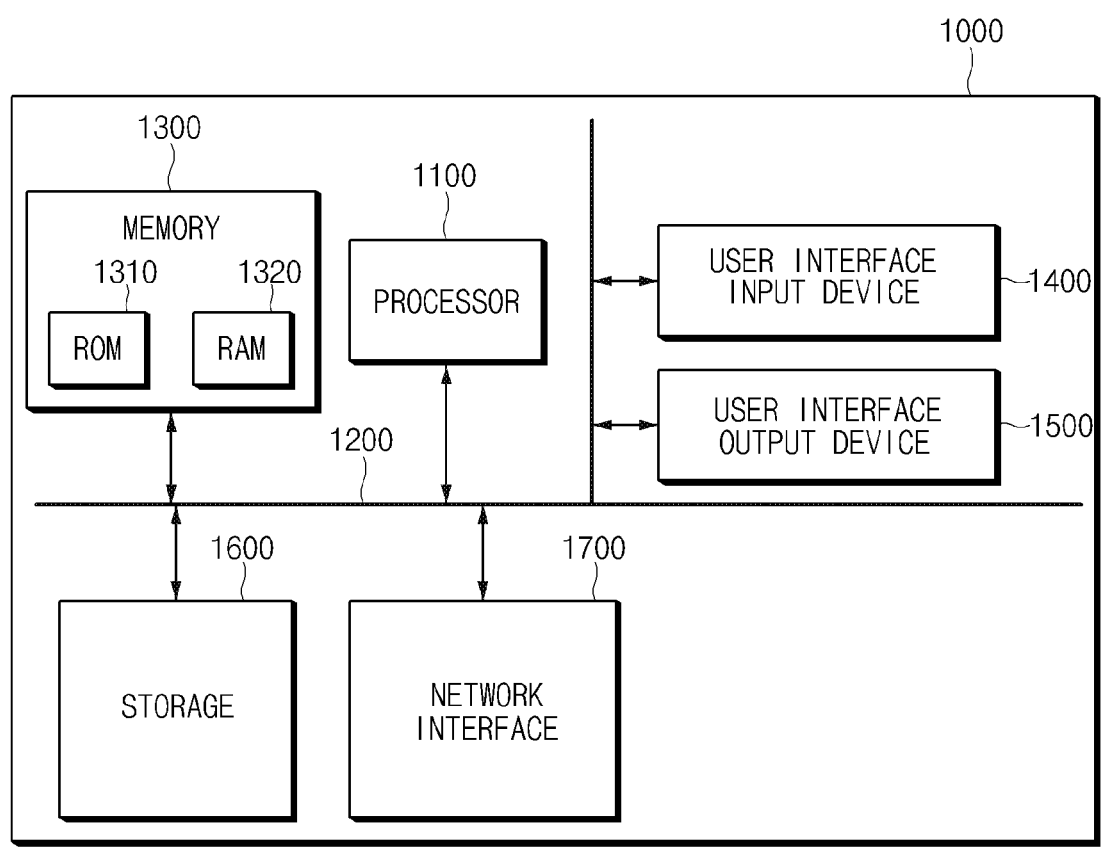
FIG. 6 is a block diagram illustrating a computing system for executing a method for detecting a passenger in a vehicle according to an exemplary embodiment of the present disclosure.

FIG. 6 is a block diagram illustrating a computing system for executing a method for detecting a passenger in a vehicle according to an exemplary embodiment of the present disclosure. Referring to FIG. 6, the method for detecting the passenger in the vehicle according to an exemplary embodiment of the present disclosure described above may be implemented through a computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The device and the method for detecting the passenger in the vehicle according to an exemplary embodiment of the present disclosure primarily detect the passenger in the precise detection mode determined based on the position and the backrest angle of each seat in the vehicle, and finally detect the passenger in the general detection mode by adjusting the position and backrest angle of each seat in the vehicle, thereby detecting the child or the pet left in the vehicle with improved accuracy.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for detecting a passenger in a vehicle, comprising:
   a sensor mounted within the vehicle;
   a controller in communication with the sensor and configured to:
   receive a position and a backrest angle of each of a plurality of seats in the vehicle and a sensor signal from the sensor;
   in response to determining that the position and backrest angle of one of the seats in the vehicle does not meet a reference position and a reference backrest angle, perform a first passenger detection by comparing the sensor signal to a first detection criterion to determine whether a passenger is detected in the seat;
   in response to detecting the passenger in the seat in the first passenger detection, adjust the position and the backrest angle of the seat to the reference position and reference backrest angle; and
   while adjusting the position and backrest angle of the seat, perform a second passenger detection by comparing the sensor signal to a second detection criterion, different than the first detection criterion, to determine whether the passenger is detected in the seat.

2. The device of claim 1, wherein the controller is further configured to:
   move the seat that does not meet the reference position and the reference backrest angle to a forefront and adjust the backrest angle of the seat to the reference backrest angle when adjusting the position and the backrest angle in response to determining that the passenger is located on the seat in the first passenger detection; and
   move the seat that does not meet the reference position and reference backrest angle to the forefront and adjust the backrest angle of the seat to a minimum backrest angle in response to determining that the passenger is not located on the seat in the first passenger detection.

3. The device of claim 1, wherein the controller is further configured to output an alert in response to detecting that the passenger is located within the vehicle.

4. The device of claim 3, wherein the controller is configured to output the alert in the form of a visually alert using an emergency light of the vehicle.

5. The device of claim 3, wherein the controller is configured to output the alert in the form of an audio alert using a horn of the vehicle.

6. The device of claim 3, wherein the controller is configured to output the alert in the form of an alert message by transmitting the alert message to a smartphone of a driver.

7. The device of claim 1, wherein the sensor is mounted on an overhead console inside the vehicle.

8. A method for detecting a passenger in a vehicle, comprising:
   receiving, by a controller, a position and a backrest angle of each of a plurality of seats within the vehicle;

determining whether the position and backrest angle of one of the seats in the vehicle meets a reference position and a reference backrest angle, in response to determining that the position and backrest angle of one of the seats in the vehicle does not meet the reference position and the reference backrest angle, performing a first passenger detection by comparing the sensor signal to a first detection criterion to determine whether a passenger is detected in the seat;

in response to detecting the passenger in the seat in the first passenger detection adjusting the position and the backrest angle of the seat to the reference position and reference backrest angle; and while adjusting the position and backrest angle of the seat, performing a second passenger detection by comparing the sensor signal to a second detection criterion, different than the first detection criterion, to determine whether the passenger is detected in the seat.

9. The method of claim 4, wherein the adjusting of the position and the backrest angle of the seat includes:

moving, by the controller, the seat that does not meet the reference position and the reference backrest angle to a forefront and adjusting the backrest angle of the seat to the reference backrest angle in response to detecting the passenger on the seat in the first passenger detection angle; and moving, by the controller, the seat that does not meet the reference position and reference backrest angle to the forefront and adjusting the backrest angle of the seat to a minimum backrest angle in response to determining that the passenger is not located on the seat in the first passenger detection.

10. The method of claim 8, further comprising:

outputting, by the controller, an alert in response to detecting that the passenger is located within the vehicle.

11. The method of claim 10, wherein the outputting of the alert includes:

outputting a visual alert by operating an emergency light of the vehicle.

12. The method of claim 10, wherein the outputting of the alert includes:

outputting an audio alert by operating a horn of the vehicle.

13. The method of claim 10, wherein the outputting of the alert includes:

transmitting, by the controller, an alert message to a smartphone of a driver.

* * * * *